Nov. 28, 1967   R. A. GARRISON ET AL   3,354,788
FLUID OPERATED BOOSTER
Filed Dec. 9, 1965   3 Sheets-Sheet 2
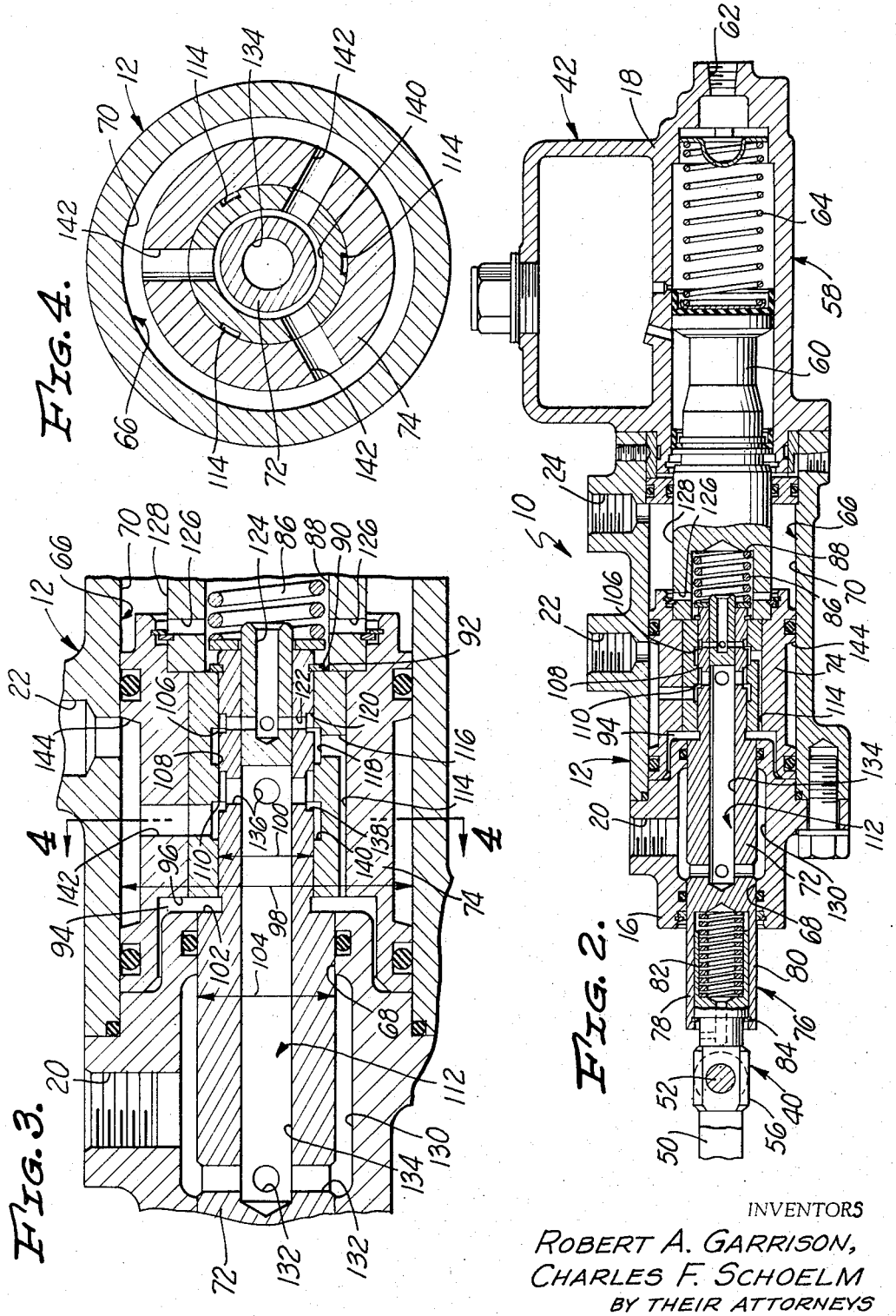
INVENTORS
ROBERT A. GARRISON,
CHARLES F. SCHOELM
BY THEIR ATTORNEYS
HARRIS, KIECH, RUSSELL & KERN Nov. 28, 1967  R. A. GARRISON ET AL  3,354,788
FLUID OPERATED BOOSTER
Filed Dec. 9, 1965   3 Sheets-Sheet 3
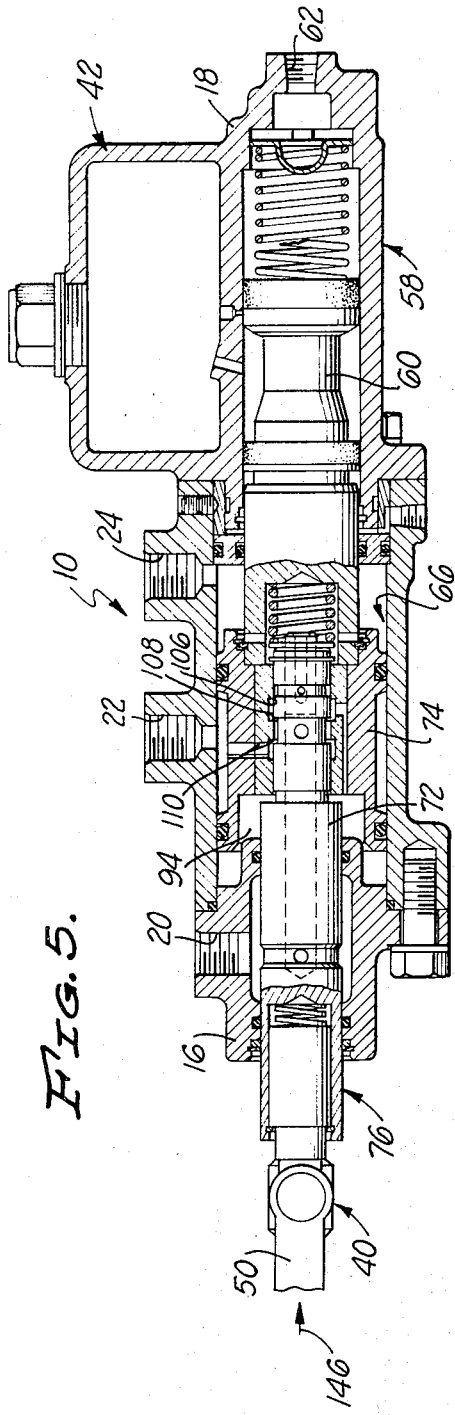
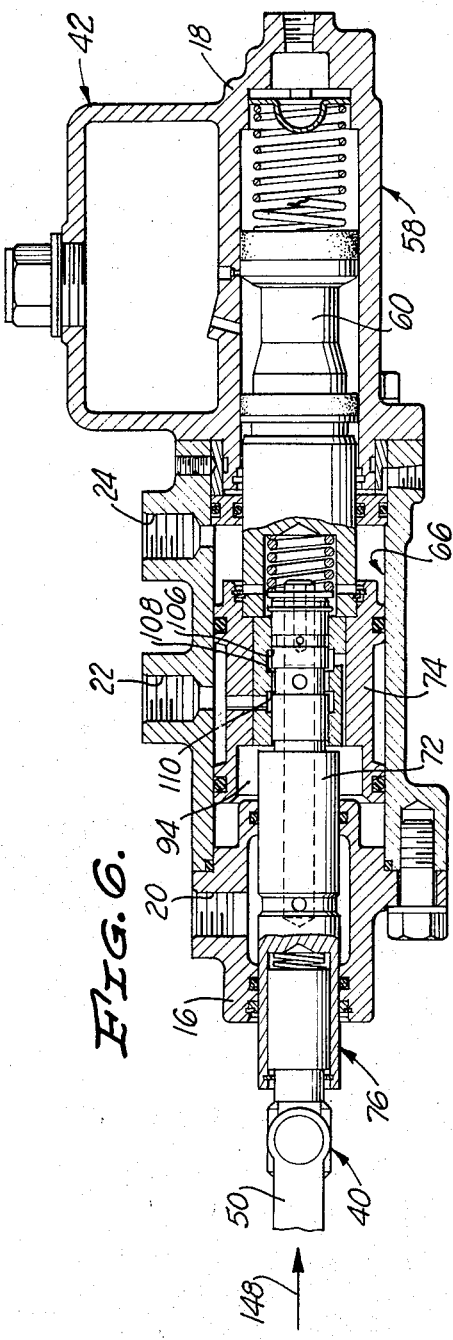
INVENTORS
ROBERT A. GARRISON,
CHARLES F. SCHOELM
BY THEIR ATTORNEYS
HARRIS, KIECH, RUSSELL & KERN

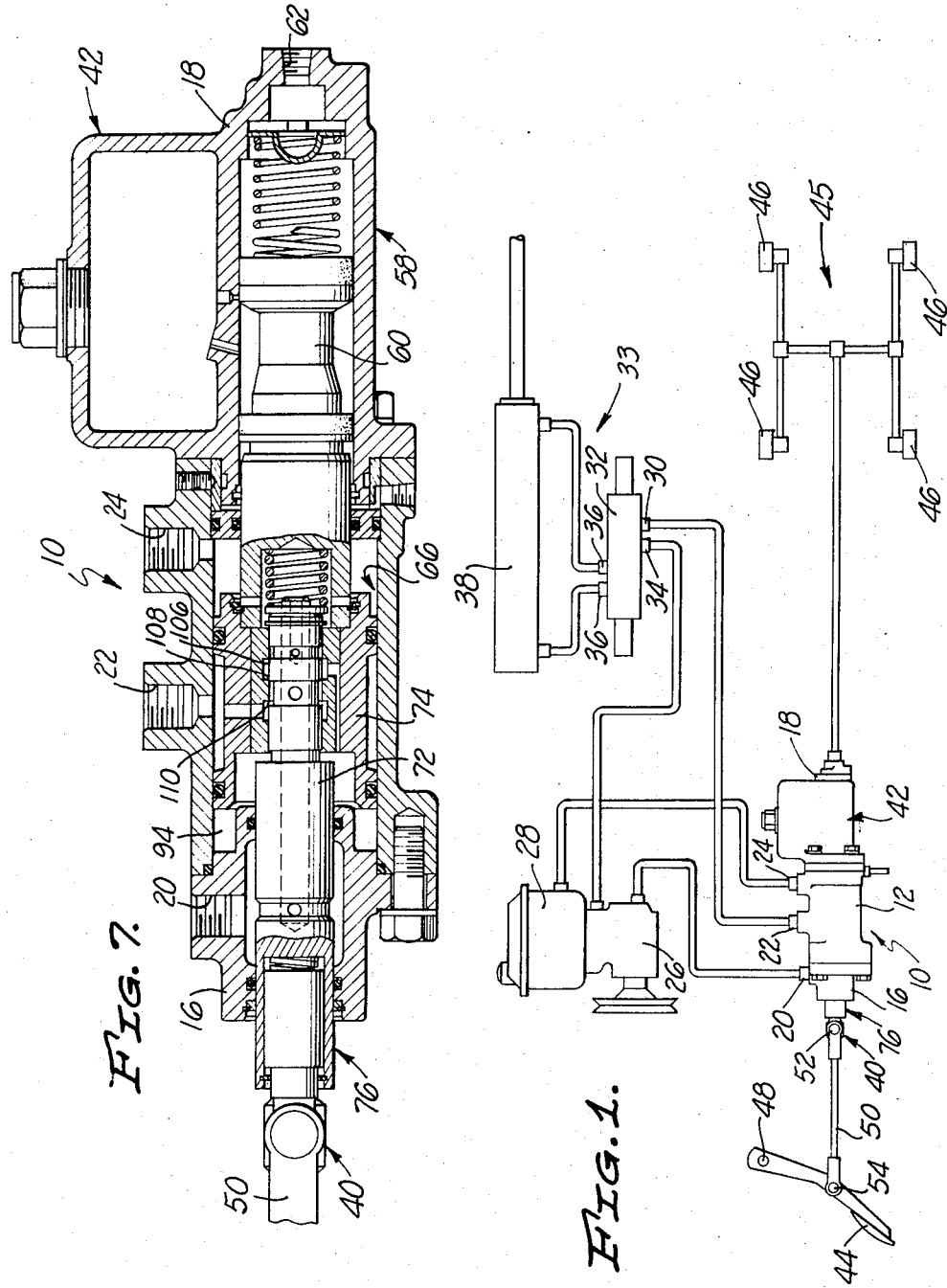

United States Patent Office 3,354,788
Patented Nov. 28, 1967

3,354,788
FLUID OPERATED BOOSTER
Robert A. Garrison, 735 Via Lido Soud, Newport Beach, Calif. 92660, and Charles F. Schoelm, Long Beach, Calif.; said Schoelm assignor to said Garrison
Filed Dec. 9, 1965, Ser. No. 512,723
2 Claims. (Cl. 91—373)

ABSTRACT OF THE DISCLOSURE

A fluid operated booster for actuating the brakes of a vehicle and for simultaneously delivering operating fluid under pressure to a power steering system of the vehicle. A brake pedal is connected to the fluid operated booster through a resilient connection which permits the booster to act as a relief valve capable of maintaining an adequate and constant supply of operating fluid under pressure to the power steering system while applying the brakes of the vehicle, without, however, interfering with the application of the brakes. The resilient connection also minimizes any tendency of the brake pedal to kick back when the power steering system is activated with the brakes applied.

Background of the invention

The present invention relates in general to a fluid operated booster the output of which is applicable to any apparatus requiring an amplified actuating force and, more particularly, to a fluid operated booster capable of applying the desired amplified actuating force to such an apparatus while simultaneously delivering operating fluid under pressure to another, fluid operated apparatus.

As an example, the fluid operated booster of the invention may be utilized to actuate the brakes of a vehicle, preferably hydraulically, and to simultaneously deliver operating fluid under pressure to a power steering system with which the vehicle is equipped. For convenience, the invention will be considered herein in such an environment without limiting it specifically thereto.

The invention contemplates a fluid operated booster of the foregoing general nature which is similar to those disclosed in our Patents Nos. 3,053,052 and 3,133,473, granted Sept. 11, 1962 and May 19, 1964, respectively. More particularly, the invention contemplates a fluid operated booster, for use with a first, fluid operated apparatus and a second apparatus which may or may not be fluid operated, comprising: a housing providing a cylinder having input and output ends and having therein an inlet port connected to a source of operating fluid under pressure, an outlet port connected to the first apparatus to deliver operating fluid under pressure thereto, and a reservoir port connected to a reservoir; concentric, relatively axially movable, input and output plungers axially movable in the cylinder and provided with passage means interconnecting the inlet and outlet ports in fluid communication; an annular actuating surface on the output plunger which faces axially away from the output end of the cylinder; an annular reaction surface on the input plunger which faces axially away from the input end of the cylinder; movable input means adjacent the input end of the cylinder for axially moving the input plunger relative to the output plunger; movable output means adjacent the output end of the cylinder and connected to the output plunger and to the second apparatus; means for biasing the input and output plungers axially toward the input end of the cylinder; and valve means embodied in the input and output plungers and responsive to relative axial movement thereof for selectively connecting the actuating and reaction surfaces in fluid communication with the inlet and reservoir ports, and for controlling the restriction to flow of operating fluid from the inlet port through the passage means to the outlet port.

Summary and objects of invention

The primary object of the invention is to provide a fluid operated booster of the foregoing nature which includes resilient means yieldably interconnecting the input means and the input plunger so that the input means and the input plunger can move axially relative to each other under various operating conditions to be set forth hereinafter. A related object is to provide such a fluid operated booster wherein the input means and the input plunger are telescopically interconnected and wherein the resilient means for yieldably interconnecting them includes a compression spring between and seated on the input means and the input plunger.

An important object of the invention is to provide a fluid operated booster of the foregoing nature wherein the resilient connecting means between the input means and the input plunger permits the booster to act as a relief valve means for maintaining an adequate and constant supply of operating fluid under pressure to the power steering system while applying the brakes of the vehicle, without, however, interfering with the application of the brakes.

Another important object is to provide a fluid operated booster of the foregoing character wherein the resilient connecting means between the input means and the input plunger substantially eliminates any tendency of the brake pedal to kick back when the power steering system is activated with the brakes applied.

The foregoing objects, advantages, features and results of the present invention, together with various other objects, advantages, features and results thereof which will be evident to those skilled in the fluid operated booster art in the light of this disclosure, may be achieved with the exemplary embodiment of the invention described in detail hereinafter and illustrated in the accompanying drawings.

Description of drawings

In the drawings:

FIG. 1 is a diagrammatic view of a power brake and steering system which incorporates the fluid operated booster of the invention;

FIG. 2 is a longitudinal sectional view of the fluid operated booster of the invention prior to applying the brakes;

FIG. 3 is an enlarged, fragmentary sectional view duplicating a portion of FIG. 2;

FIG. 4 is a transverse sectional view taken as indicated by the arrowed line 4—4 of FIG. 3;

FIGS. 5 and 6 are views similar to FIG. 2, but with the brakes applied; and

FIG. 7 is a view similar to FIG. 2, but with the brakes applied and with the power steering system in operation.

Detailed description of preferred embodiment of invention

Referring particularly to FIG. 1 of the drawings, the fluid operated booster of the invention is designated generally by the numeral 10 and includes a housing 12 suitably mounted in the vehicle, not shown, in which the booster is to be used, and having input and output ends 16 and 18. The housing 12 is provided with an inlet port 20, an outlet or working port 22 and a reservoir port 24.

The inlet port 20 is connected to the outlet of a hydraulic pump 26 which may be driven by the engine, not shown, of the vehicle in which the fluid operated booster 10 is installed. The inlet of the pump 26 is connected to a reservoir 28. The pump 26 and the reservoir 28 are shown as combined in a single unit, as is conventional in pumps for automotive-type power steering systems.

The outlet port 22 of the booster 10 is connected to an inlet port 30 of a control valve 32 of a fluid operated power steering system 33, not completely shown, with which the vehicle is equipped. The control valve 32 may be similar to those disclosed in Patents Nos. Re. 23,867, reissued Sept. 14, 1954, and 2,824,447, issued Feb. 25, 1958, to Robert A. Garrison, one of the inventors of the booster 10. The control valve 32 includes an outlet port 34 connected to the reservoir 28, and includes operating or working ports 36 respectively connected to opposite ends of a reciprocating-type, fluid operated, steering motor 38 connected to the steerable wheels of the vehicle. The control valve 32 is of the open-center type so that the operating fluid entering it through the inlet port 30 circulates freely through the control valve, and back to the reservoir 28, when no steering is taking place. However, when the vehicle is steered in one direction or the other, the operating fluid entering the inlet port 30 is directed to one or the other of the working ports 36, the displaced operating fluid from the steering motor 38 entering the control valve 32 through the other working port and being directed to the outlet port 34 connected to the reservoir 28. Thus, the control valve 32 imposes no restriction to flow from the outlet port 22 of the booster 10 to the reservoir 28 when no steering is taking place, except for the normal pressure drops in the control valve 32 and in the lines connecting it to the booster 10 and the reservoir 28.

The reservoir port 24 of the booster 10 is connected to the reservoir 28.

As shown in FIG. 2, the fluid operated booster 10 is provided at its input and output ends 16 and 18 with coaxial input and output means 40 and 42 respectively connected to a brake pedal 44 and a brake system 45 of the vehicle in which the booster is installed, the brake system including individual wheel brakes 46.

The brake pedal 44 is suitably pivotally mounted in the vehicle at 48. A compression link 50 is pivotally connected to the input means 40 and the brake pedal 44 at 52 and 54, respectively. More particularly, the pivot 52 connects the link 50 to an axially movable input member 56 which forms part of the input means 40 and which will be described in more detail hereinafter.

The output means 42 is shown as comprising a conventional master cylinder 58 having a master piston 60 coaxial with the input member 56 and serving as an output member of the booster 10. The master piston 60 is adapted to displace brake fluid from the master cylinder 58 through an output port 62 suitably connected to the brakes 46. A compression spring 64 within the master cylinder 58 biases the master piston 60 toward the input end 16 of the booster 10. Since the master cylinder 58 is conventional, no further description herein is necessary.

The housing 12 is provided with a cylinder 66 which is coaxial with the input and output members 56 and 60, and which includes a minor-diameter portion 68 at the input end 16 of the housing and a major-diameter portion 70 adjacent the output end 18 of the housing. The inlet port 20 communicates with the minor cylinder portion 68 and the outlet and reservoir ports 22 and 24 communicate with the major cylinder portion 70.

The fluid operated booster 10 includes concentric, telescopically interconnected, relatively axially movable, input and output plungers 72 and 74 respectively movable axially of the minor and major cylinder portions 68 and 70.

The input plunger 72 is yieldably connected to the input member 56 by a resilient connecting means 76 of the invention. More particularly, the input member 56 and the input plunger 72 respectively include telescopically interconnected, oppositely facing, cup-shaped elements 78 and 80 biased apart by a compression spring 82 seated on the "bottoms" of the cup-shaped elements, the spring 82 being referred to hereinafter as a compensating spring or as an input spring. As will be apparent, the input spring 82, which is normally in a state of compression, biases the input member 56 and the input plunger 72 axially apart, separation of the cup-shaped elements 78 and 80 being prevented by a lock ring 84. It will be noted that when the brake pedal 44 is depressed, the input plunger 72 is displaced toward the output end 18 of the housing 12 through the input spring 82, which is further compressed axially under certain conditions of operation, as will be described in detail hereinafter in considering the operation of the booster 10.

The output plunger 74 is suitably rigidly connected to the output member or master piston 60. The input and output plungers 72 and 74 are biased axially apart, toward the relative positions shown in FIGS. 2 and 3 of the drawings, by a compression spring 86 seated against the input plunger and the output member 60 and disposed in a bore 88 in the output member. Movement of the input and output plungers 72 and 74 axially apart beyond the relative positions shown in FIGS. 2 and 3 is prevented by a lock ring 90 carried by the input plunger 72 and engageable with an annular shoulder 92 on the output plunger 74.

As best shown in FIG. 3, within the major cylinder portion 70 adjacent the minor cylinder portion 68 is an annular actuating and reaction chamber 94 selectively connectible in fluid communication with the inlet and reservoir ports 20 and 24 in a manner to be described. The chamber 94 has a movable end wall formed by an annular actuating surface 96 on the output plunger 74, the outside and inside diameters of this annular actuating surface being designated by the arrows 98 and 100, respectively. It will be noted that the annular actuating surface 96 faces axially away from the output end 18 of the housing 12 so that, when the chamber 94 is connected to the inlet port 20, the operating fluid under pressure provided by the pump 26 biases the output plunger 74 toward the output end 18 of the housing 12 to actuate the master cylinder 58, and thus the brake system 45.

An opposite movable wall of the chamber 94 is formed by an annular reaction surface 102 of the input plunger 72. The inside and outside diameters of the reaction surface 102 are designated by the arrow 100 and an arrow 104, respectively. It will be noted that the annular reaction surface 102 faces axially away from the input end 16 of the housing 12 so that, when the chamber 94 is connected to the inlet port 20, the operating fluid under pressure biases the input plunger 72 toward the input end of the housing. Thus, when operating fluid under pressure is present in the chamber 94, it tends to bias the input and output plungers 72 and 74 into the relative positions shown in FIG. 7 of the drawings.

Referring to FIG. 3, the input and output plungers 72 and 74 are respectively provided with external and internal valve lands which provide variable valve passages or gaps 106, 108 and 110. When the input and output plungers 72 and 74 are in the relative positions shown in FIGS. 2 and 3 of the drawings, the valve gaps 106 and 110 are fully open, and the valve gap 108 is fully closed. Movement of the input plunger 72 toward the right relative to the output plunger 74, as viewed in the drawings, initially reduces the gaps 106 and 110, and ultimately closes the gap 106 and opens the gap 108. Normally, the gap 110 never closes completely, for reasons which will become apparent.

Considering the functions of the valve gaps 106, 108 and 110, and continuing to refer particularly to FIG. 3 of the drawings, the gap 106 controls communication between the chamber 94 and the reservoir port 24, the gap 108 controls communication between the chamber 94 and the inlet port 20, and the gap 110 controls the restriction to flow of operating fluid from the inlet port 20 to the outlet port 22 through a passage means 112 in the input and output plungers 72 and 74.

More particularly, when the valve gap 106 is open, it connects the chamber 94 to the reservoir port 24 through longitudinal passages 114 in the output plunger 74, radial ports 116 in the output plunger, an internal annular channel 118 in the output plunger, an external annular channel 120 in the input plunger 72, radial ports 122 in the input plunger, an axial passage 124 in the input plunger, the bore 88 in the output member 60, radial ports 126 in the member 60, and an annular clearance 128 around the member 60 and leading to the reservoir port 24.

When the gap 108 is open, it connects the inlet port 20 to the chamber 94 through an internal annular channel 130 in the housing 12, radial ports 132 in the input plunger 72, an axial passage 134 in the input plunger, radial ports 136 in the input plunger, an external annular channel 138 in the input plunger, the channel 118 in the output plunger 74, the ports 116 in the output plunger, and the passages 114 in the output plunger.

The valve gap 110 constantly, but variably, connects the inlet port 20 to the outlet port 22 through the passage means 112, which passage means includes the channel 130 in the housing 12, the ports 132 in the input plunger 72, the passage 134 in the input plunger, the ports 136 in the input plunger, the channel 138 in the input plunger, an internal annular channel 140 in the output plunger 74, radial ports 142 in the output plunger, and an external annular channel 144 in the output plunger, the latter channel communicating with the outlet port 22 in all positions of the output plunger.

*Operation, brakes not applied*

FIGS. 2 and 3 of the drawings illustrate the positions of the various parts of the booster 10 of the invention when the brakes 46 are not applied. The power steering system 33 may either be in operation, or inoperative.

More particularly, under the conditions shown in FIG. 2, no input force is applied to the input means 40. Consequently, the input spring 82 is fully extended. Similarly, the master-cylinder spring 64 is fully extended to maintain the output plunger 74 in its leftmost position, as viewed in FIG. 2. The spring 86 is also fully extended to maintain the input plunger 72 in its leftmost position relative to the output plunger 74. Under these conditions, the valve gap 106 is fully open, the valve gap 108 is closed, and the valve gap 110 is fully open.

Since the gap 106 is fully open and the gap 108 is closed, the actuating and reaction chamber 94 is connected to the reservoir port 24. Consequently, there is no pressure in the chamber 94 tending to displace the output plunger 74 to the right to actuate the master cylinder 58 and thus the brakes 46. Since the valve gap 110 is fully open, the entire output of the pump 26 is available to operate the power steering system 33, should steering be necessary under these conditions.

*Operation, brakes applied without steering*

FIGS. 5 and 6 of the drawings illustrate the operation of the booster 10 of the invention when the brakes 46 are applied with the power steering system 33 not in operation. FIG. 5 illustrates the positions of the various parts in response to an input force 146 sufficient only to take up the "slack" in the brake system. In other words, FIG. 5 illustrates the relative positions of the parts of the booster 10 after sufficient movement of the input means 40 to displace from the master cylinder 58 the volume of brake fluid necessary to take up the slack in the brake system 45. FIG. 6 illustrates the relative positions assumed by the parts of the booster 10 in response to a larger input force 148 sufficient to apply the brakes 46 after the slack has been taken up. As will be explained, FIG. 5 illustrates a volume control condition achieved by the booster 10, while FIG. 6 illustrates a pressure control condition achieved thereby.

Considering FIG. 5 in more detail, it will be noted that the input force 146 has displaced the input plunger 72 to the right relative to the output plunger 74, thereby closing the valve gap 106, opening the valve gap 108, and partially closing the valve gap 110. Closure of the gap 106 disconnects the chamber 94 from the reservoir port 24, while opening of the gap 108 connects the chamber 94 to the inlet port 20. At the same time, the increased flow restriction produced by the partial closure of the gap 110 creates a back pressure in the chamber 94 which acts on the actuating surface 96 to cause the output plunger 74 to follow the input plunger 72 as the latter is moved to the right by the input force 146. The output plunger 74 displaces the output member or master piston 60 to the right to displace brake fluid out the output port 62 into the lines leading to the brakes 46. Ultimately, the slack in the brake system 45 is taken up, this occurring as the parts arrive in the positions shown in FIG. 5. The input force 146 required to move the various parts into the positions shown in FIG. 5 is relatively small, being only that required to cause the master piston 60 to displace the volume of brake fluid necessary to take up the slack in the brake system 45, e.g., to seat the shoes of the brakes 46 against the drums thereof. Consequently, little or no compression of the input spring 82 is necessary to achieve the conditions of FIG. 5.

Viewing the situation a little differently, the changes required in going from the relative positions of FIG. 2 to the relative positions of FIG. 5 are only those necessary to displace the volume of brake fluid needed to take up the slack in the brake system 45. In other words, going from the relative positions of FIG. 2 to the relative positions of FIG. 5 involves merely volume control with respect to the brake fluid displaced into the brake system 45. After the slack in the brake system 45 has been taken up, the booster 10 of the invention achieves pressure control of the brake fluid in the brake system. The pressure control condition is illustrated in FIG. 6 of the drawings.

Referring to FIG. 6, after the slack in the brake system 45 has been taken up as hereinbefore outlined, an increased input force 148 is necessary to actually apply the brakes 46. This increased input force displaces the input plunger 72 to the right relative to the output plunger 74, as compared to the relative positions of these plungers shown in FIG. 5. It should be noted in passing that it is necessary to compress the input spring 82 to some extent to accomplish this. The result of the increased displacement of the input plunger 72 relative to the output plunger 74 is to further restrict the valve gap 110 interconnecting the inlet and outlet ports 20 and 22, thereby further increasing the back pressure in the chamber 94. Such further increased back pressure acts on the actuating surface 96 to cause the master piston 60 to develop the fluid pressure in the brake system 45 necessary to actually apply the brakes 46 to retard the motion of the vehicle. The extent to which the brakes 46 are applied depends upon the extent of the increased displacement of the input plunger 72 relative to the output plunger 74, and depends in turn upon the magnitude of the input force 148. In this connection, it will be noted that the increased back pressure in the chamber 94 acts on the reaction surface 102 to resist further movement of the input plunger 72 toward the right. This provides the operator with a "feel" which is a function of the extent to which the brakes 46 are applied. It should be noted that this "feel" also exists in taking up the slack in the brake system 45, the taking up of the slack being indicated by a sudden rise in the input force necessary to produce further movement of the input plunger 72.

With the various parts in the positions of FIG. 6, if it is desired to further increase the pressure in the brake system 45 to further increase the degree to which the brakes 46 are applied, it is necessary to proportionately increase the input force 148 to achieve sufficient further movement of the input plunger 72 relative to the output plunger 74 to produce the necessary back pressure increase in the chamber 94. Such an increase in the input force 148 produces further compression of the input spring 82. Thus, under the conditions shown in FIG. 6 of the drawings, the booster 10 is utilized strictly as a pressure control device with respect to the fluid in the brake system 45.

Thus, the booster 10 of the invention performs a volume control function with respect to the fluid in the brake system 45 until the slack in the brake system is taken up, and thereafter performs a pressure control function.

It will be noted from FIGS. 5 and 6 of the drawings that as the slack in the brake system 45 is taken up, and as the brakes 46 are subsequently applied, the valve gap 110 is never completely closed. Consequently, operating fluid under pressure is always available for operating the power steering system 33, without, however, interfering with the application of the brakes 46. The manner in which this is accomplished is discussed in the next section of this specification.

*Operation, brakes applied and steering system activated*

If the parts of the booster 10 are in the relative positions shown in FIG. 6 so that the brakes 46 are actually applied to retard the vehicle, and if the power steering system 33 is then activated, the parts assume the relative positions shown in FIG. 7 of the drawings. More particularly, when the steering system is activated, a back pressure is produced between the outlet port 22 of the booster 10 and the inlet port 30 of the steering control valve 32, which back pressure is reflected back to the chamber 94 through the gap 108. The end result is an increased back pressure in the chamber 94 which acts on the reaction surface 102 of the input plunger 72 to displace the input plunger to the left slightly relative to the output plunger 74, the input spring 82 compressing further to permit this. The slight leftward movement of the input plunger 72 relative to the output plunger 74 substantially closes the gap 108, without opening the gap 106, and increases the extent to which the gap 110 is open. Consequently, the operating fluid under pressure can flow freely through the gap 110 into the steering system 33.

Under the foregoing conditions, the restriction to flow through the passage means 112 which is provided by the gap 110 causes the booster 10 to operate as a relief valve. More particularly, the input spring 82 permits the input plunger 72 to seek a position wherein it maintains the pressure in the chamber 94 necessary to maintain the desired application of the brakes 46, and wherein it simultaneously freely meters the operating fluid under pressure to the steering system 33 to operate it. This relief valve action provided by the input spring 82 is an important feature of the invention.

Another important function performed by the input spring 82 is that when the power steering system 33 is activated with the brakes 46 applied, it compresses to prevent any substantial kick back of the brake pedal 44. Thus, while the operator senses an increased reaction force acting on the reaction surface 102 of the input plunger 72 when the power steering system 33 is activated with the brakes 46 applied, there is no appreciable tendency for the brake pedal 44 to kick back since the leftward motion of the input plunger is absorbed by further compression of the input spring 82.

*Operation, releasing brakes*

When the brakes 46 are released, with the steering system 33 operative or inoperative, the reduction to zero of the input force applied to the input means 40 permits the springs 64, 82 and 86 to return the parts to the positions shown in FIGS. 2 and 3 of the drawings. More particularly, the spring 86 first displaces the input plunger 72 to the left relative to the output plunger 74 sufficiently to open the gap 106, close the gap 108, and fully open the gap 110. Consequently, the chamber 94 is connected to the reservoir port 24 to permit the spring 64 to return the input and output plungers 72 and 74 to the positions shown in FIG. 2. At the same time, if the power steering system 33 is in operation, it continues in operation through the gap 110.

Although an exemplary embodiment of the invention has been disclosed herein for purposes of illustration, it will be understood that various changes, modifications and substitutions may be incorporated in such embodiment without departing from the spirit of the invention as defined by the claims appearing in the next section hereof.

We claim as our invention:

1. In a fluid operated booster for use with a fluid operated apparatus and another apparatus, the combination of:
   (a) a housing providing a cylinder having input and output ends and having therein an inlet port connectible to a source of operating fluid under pressure, an outlet port connectible to said fluid operated apparatus to deliver operating fluid under pressure thereto, and a reservoir port connectible to a reservoir;
   (b) concentric, relatively axially movable, input and output plungers axially movable in said cylinder and provided with passage means interconnecting said inlet and outlet ports in fluid communication;
   (c) said output plunger having an annular actuating surface which faces axially away from said output end of said cylinder;
   (d) said input plunger having an annular reaction surface which faces axially away from said input end of said cylinder;
   (e) movable input means adjacent said input end of said cylinder for axially moving said input plunger relative to said output plunger;
   (f) resilient connecting means yieldably interconnecting said input means and said input plunger;
   (g) movable output means adjacent said output end of said cylinder and connected to said output plunger and connectible to said other apparatus;
   (h) means for biasing said input and output plungers axially toward said input end of said cylinder; and
   (i) valve means embodied in said input and output plungers and responsive to relative axial movement thereof for selectively connecting said actuating and reaction surfaces in fluid communication with said inlet and reservoir ports, and for controlling the restriction to flow of operating fluid from said inlet port through said passage means to said outlet port, said input means and said input plunger being telescopically interconnected and said resilient connecting means including a compression spring between and seated on said input means and said input plunger.

2. A fluid operated booster as set forth in claim 1 wherein said input means and said input plunger respectively include telescopically interconnected, oppositely facing, cup-shaped elements containing said compression spring.

References Cited

UNITED STATES PATENTS

| 2,715,892 | 8/1955 | Rodeck et al. | 91—387 |
| 3,053,052 | 9/1962 | Garrison et al. | 91—378 |
| 3,096,690 | 7/1963 | Hayner | 91—387 |
| 3,133,473 | 5/1964 | Garrison et al. | 91—378 |

FOREIGN PATENTS

| 1,325,616 | 3/1963 | France. |

MARTIN P. SCHWADRON, *Primary Examiner.*

PAUL E. MASLOUSKY, *Examiner.*